United States Patent
Nuris et al.

(10) Patent No.: US 7,549,462 B2
(45) Date of Patent: Jun. 23, 2009

(54) COIL FOR COOLANT CIRCULATION, METHOD FOR MAKING SAME AND REACTOR COMPRISING SAME

(75) Inventors: Thierry Nuris, St. Bonnet de Mure (FR); Jean-François Thierry, Francheville (FR)

(73) Assignee: Rhodia Polyamide Intermediates, Saint-Fons (FR)

( * ) Notice: Subject to any disclaimer, the term of this patent is extended or adjusted under 35 U.S.C. 154(b) by 49 days.

(21) Appl. No.: 10/502,178

(22) PCT Filed: Jan. 20, 2003

(86) PCT No.: PCT/FR03/00177
§ 371 (c)(1),
(2), (4) Date: Dec. 23, 2004

(87) PCT Pub. No.: WO03/062728
PCT Pub. Date: Jul. 31, 2003

(65) Prior Publication Data
US 2005/0115699 A1     Jun. 2, 2005

(30) Foreign Application Priority Data
Jan. 21, 2002     (FR) ................... 02 00706

(51) Int. Cl.
*F28F 9/26*     (2006.01)
*F28D 7/02*     (2006.01)

(52) U.S. Cl. .................. 165/145; 165/163; 422/138; 422/201

(58) Field of Classification Search ............ 165/145, 165/163; 422/138, 201
See application file for complete search history.

(56) References Cited

U.S. PATENT DOCUMENTS

| | | | | |
|---|---|---|---|---|
| 921,627 | A * | 5/1909 | Reynolds ............... | 165/163 |
| 2,050,465 | A * | 8/1936 | Salvo et al. ............. | 165/145 |
| 2,160,898 | A * | 6/1939 | Peff ....................... | 165/163 |
| 2,508,247 | A * | 5/1950 | Giauque ................. | 165/163 |
| 3,116,790 | A * | 1/1964 | Walter ................... | 165/163 |
| 3,199,583 | A * | 8/1965 | Hood, Jr. et al. ........ | 165/163 |
| 3,877,881 | A * | 4/1975 | Ono et al. ............ | 165/109.1 |
| 4,371,036 | A * | 2/1983 | Fordsmand ............. | 165/163 |
| 4,462,463 | A * | 7/1984 | Gorham, Jr. ........... | 165/145 |
| 6,189,605 | B1 * | 2/2001 | Lameris ................. | 165/163 |

* cited by examiner

*Primary Examiner*—Leonard R Leo
(74) *Attorney, Agent, or Firm*—Buchanan, Ingersoll & Rooney P.C.

(57) ABSTRACT

This invention relates to a coil comprising a first helical tube segment (511) and a second helical tube segment (512, 513) extending, parallel to the first helical segment (511), between a distributor (53) and a manifold (54), said first and second helical segments (511, 512, 513) being centred on a common geometrical axis ($X_5$), with substantially the same bending radius ($R_1$) and nested, such that they form together a globally cylindrical bundle (51). The method comprises a step which consists in interleaving the helical tube segments (511-513) so as to form a globally cylindrical bundle. The invention also concerns a reactor equipped with such a coil which can be used for treating a viscous medium or for carrying out chemical reactions, such as 6-6 polyamide polymerization.

26 Claims, 4 Drawing Sheets

COIL FOR COOLANT CIRCULATION, METHOD FOR MAKING SAME AND REACTOR COMPRISING SAME

This application is an application under 35 U.S.C. Section 371 of International Application Number PCT/FR03/00177 filed on Jan. 20, 2003.

BACKGROUND OF THE INVENTION

The present invention relates to a coil for circulation of coolant fluid and to a method for manufacturing such a coil. The invention also concerns a reactor for the treatment of a viscous medium or for carrying out chemical reactions in a viscous medium, such as a polymerization, such a reactor comprising such a coil. Finally, the invention concerns the use of such a reactor.

It is known to effect polymerization of polyamide continuously or discontinuously. In the so-called discontinuous methods, one proceeds by batches with reactors of autoclave type. In that case, it is known to evaporate the water of an aqueous solution of two monomers and the water produced by their polymerization, thanks to an outside heat supply.

Such heat supply must be sufficient for the reaction of polymerization to take place in a period of time compatible with the criteria of productivity in force in the industrial world. The heat supply must not be too great in order to avoid, as far as possible, entraining one of the monomers with the vapour phase. If a quantity of monomers is entrained with the vapour phase, this quantity must be constant in order that the characteristics of the polyamide obtained be reproducible. Furthermore, the supply of heat makes it possible to monitor the reaction of polymerization insofar as it allows the evaporation of the water to be controlled.

To supply heat to the reaction medium, coils in which a coolant fluid circulates have been used in low-capacity autoclaves, i.e. ones with a volume less than 3 m$^3$.

For reactors of greater capacity, in particular of the order of 5 to 6 m$^3$, it has been possible to envisage using a coil and an agitator, the latter aiming at improving the homogeneity of the reaction medium and at increasing the coefficient of heat transfer.

However, this solution cannot be applied to high-capacity reactors, in particular ones with a capacity greater than 8 m$^3$, as it is impossible to sufficiently increase the exchange surfaces constituted by the walls of the coil. In effect, if the overall diameter of the coil is increased, it is in that case no longer possible to house an efficient agitator in the vessel of the reactor. If the diameter of the tubes constituting the coil is decreased, the pressure drops associated with the circulation of coolant fluid in these tubes increase significantly. If a coil of very elaborate shape is created, the axial re-circulation of the reaction medium is hindered and the so-called "pumping" effect at the centre of the agitator is cancelled. Finally, a coil of elaborate shape with tubes of small diameter would not satisfy the criteria of mechanical strength allowing it to withstand prolonged use and/or incidents in manufacture.

It is a more particular object of the present invention to overcome these drawbacks by proposing a novel coil which allows an efficient heat supply to a reaction medium of large volume, while being compatible with the dimensions of a reactor vessel and with an agitator.

BRIEF SUMMARY OF THE INVENTION

To that end, the invention relates to a coil for circulation of a coolant fluid, this coil comprising at least one segment of tube wound along a helical generatrix, characterized in that it comprises at least a second segment of tube wound along a helical generatrix extending in parallel to the first segment between a distributor and a manifold, these first and second segments being centred on the same geometrical axis, with substantially the same bending radius and nested so that they together form a substantially cylindrical bundle.

Thanks to the use of two nested helical tube segments, it is possible that these segments each have a relatively short length, with the result that the pressure drop that they generate is relatively slight, even if the cross-section of the tube used may also be small. In addition, the fact that the helical tube segments have a relatively short length induces a relatively considerable slope thereof, i.e. greater than in the case of a single circular segment extending over the whole height of the coil. In this way, in the case of the coolant fluid being supplied in vapour phase able to condense in the tubes, the flow of the condensed fluid in these segments is more rapid, hence less risk of accumulation of condensates and less space requirement for liquid. The fact that these segments form a cylindrical bundle avoids their significantly disturbing the flow or re-circulation of the reaction medium in the central part of a reactor.

According to a first advantageous and non-obligatory aspect of the invention, the coil comprises a second bundle, formed by at least one segment of tube wound along a helical generatrix, extending between the distributor and the manifold and centred on the axis of the first helical segments, this second bundle being of substantially cylindrical shape, with a radius smaller than the radius of the first bundle. In that case, the second bundle is advantageously formed by at least two nested helical segments of tube, extending in parallel between the distributor and the manifold.

According to other advantageous but non-obligatory aspects of the invention, the coil incorporates one or more of the following characteristics:

- the first bundle is formed by three nested helical segments of tube.
- the helical segments have substantially the same length and/or induce substantially the same pressure drop on the flow of the coolant fluid between the distributor and the manifold.
- a tube is provided which extends, in a direction substantially parallel to the axis of the first bundle, between the first and second bundles, this tube being connected either to the distributor or to the manifold.
- the distributor and/or the manifold are toric in shape, centred on the axis of the first bundle. In that case, the distributor and/or the manifold may be provided to be curved with a radius substantially equal to the radius of the first bundle or possibly of the second bundle, with the result that they are substantially in line with this first bundle or possibly with this second bundle.

The invention also relates to a method for manufacturing a coil as described hereinabove and, more specifically, to a method which comprises a step consisting in interleaving two segments of tube wound along helical generatrices and with substantially the same bending radius, so as to form a substantially cylindrical bundle.

The segments of tube are advantageously interleaved by a movement of "screwing" about a geometrical axis common to these segments.

The invention also relates to a reactor for the treatment of a viscous medium or for carrying out chemical reactions in a viscous medium, such as a polymerization, this reactor comprising, inter alia, a coil as described hereinbefore.

According to a first advantageous aspect of the invention, this reactor may comprise an agitator arranged around or inside the coil. The agitator may be suspended from the ceiling of the reactor and form a cage surrounding the coil, the supply and evacuation of the coolant fluid towards or from the coil being effected through the bottom of the reactor. According to another form of embodiment of the invention, the agitator may be formed by an endless screw centred on the geometrical axis of an inner bundle or of the single bundle of the coil.

According to another aspect of the invention, the inner bundle or the single bundle of the coil forms a central well of radius included between 20 and 70% of the radius of the vessel, which allows a good re-circulation of the reaction medium in the vessel. In the case of a coil with two bundles, the central well formed by the inner bundle preferably has a radius included between 20 and 40% of the radius of the vessel.

Finally, the invention relates to the use of a reactor as described hereinabove having a volume greater than about 8 m$^3$, for the treatment of a viscous medium or the preparation of polymers such as polyamides, in particular 6-6 polyamide, or polyesters. This use may be discontinuous, for example for manufacturing batches of polymers of large volume, or continuous.

BRIEF DESCRIPTION OF THE DRAWINGS

The invention will be more readily understood and other advantages thereof will appear more clearly on reading the following description of a form of embodiment of a coil and a reactor according to the invention, of their respective manufacture and use, given solely by way of example and made with reference to the accompanying drawings, in which.

DETAILED DESCRIPTION OF THE INVENTION

Figure 1:
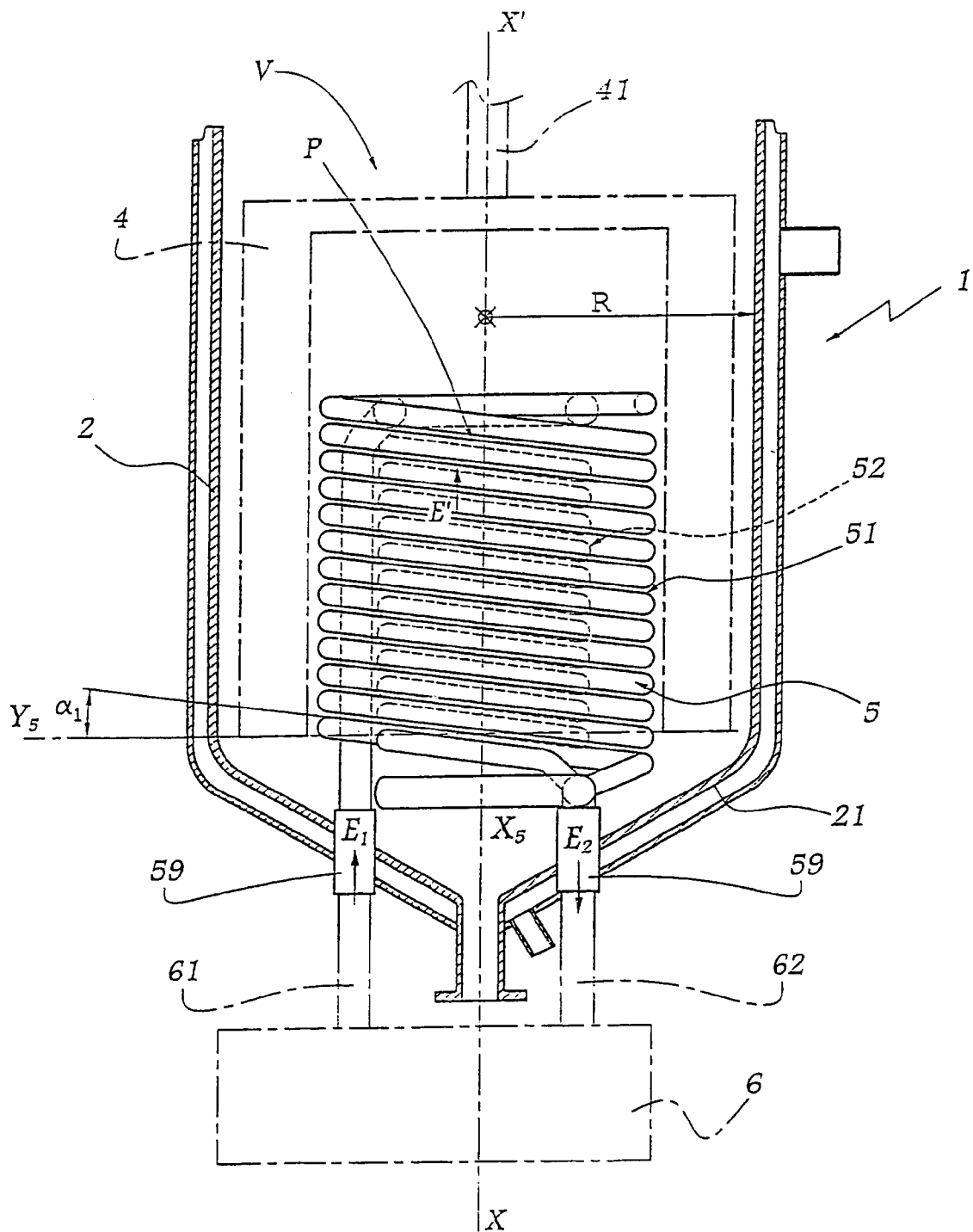
FIG. 1 is a longitudinal section through a reactor according to the invention equipped with a coil according to the invention.
Figure 2:
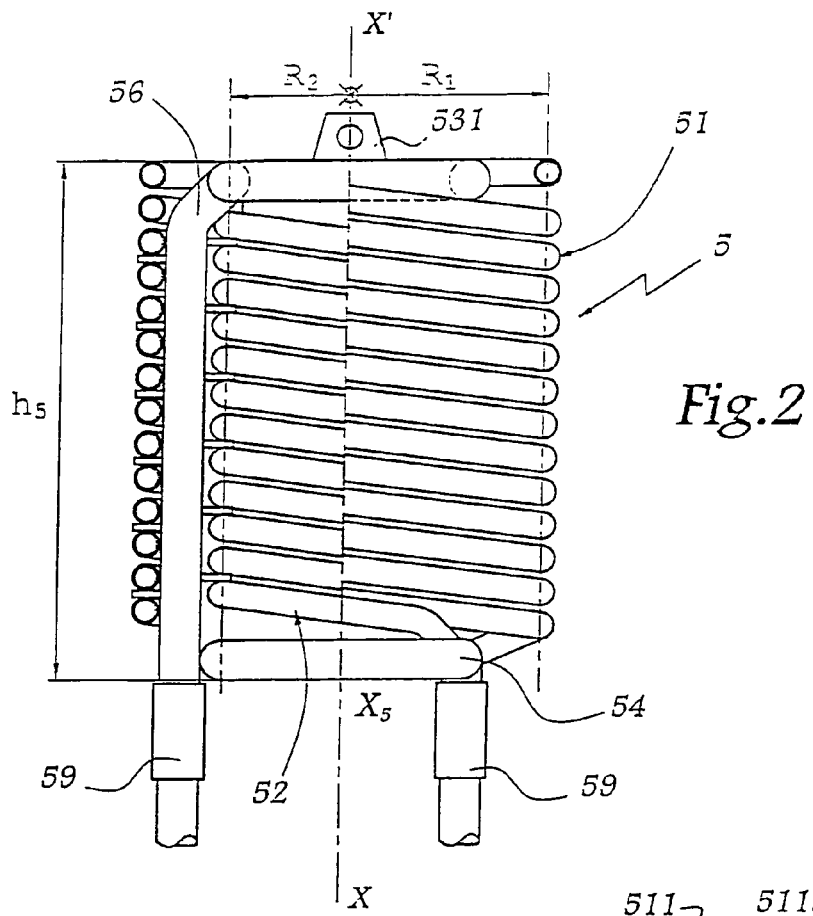
FIG. 2 is a half-section of the coil shown in FIG. 1.

The reactor 1 shown in FIG. 1 is used for the polymerization of polyamide. It has a volume V of the order of 11 m$^3$. This reactor 1 comprises a vessel 2 of substantially cylindrical shape with a substantially truncated bottom 21. A cover (not shown) is provided to be mounted on the vessel 2 in order to constitute the ceiling thereof and to ensure seal of the interior volume V of the reactor 1 with respect to the ambient medium.

An agitator 4 is provided in the volume V. It is driven by a shaft 41 aligned on a central axis X-X' of the reactor and passing through the cover. The agitator 4 comprises substantially helical blades mounted on a cage which surrounds a coil 5. In order to render the drawing clearer, the agitator 4 is silhouetted in dashed and dotted lines solely in FIG. 1.

Other forms of agitators may be envisaged, as long as they are compatible with the space available in the volume V.

The vessel 2 is of double envelope type in order to allow the circulation of a coolant fluid, this allowing the volume V to be heated.

A coil 5 is installed inside the vessel 2 and is supplied with coolant fluid from a vaporizer 6 which may be of any known type. Two partition passages 59 connect the coil 5 to tubes 61 and 62 respectively allowing supply of the coil 5 with hot coolant fluid and evacuation of comparatively less hot coolant fluid in the direction of the vaporizer 6.

In the present case, the coolant fluid is an oil in vapour phase at a temperature included between 300 and 350° C. Oil in vapour phase behaves like a pure body and works in latent heat, with the result that it conserves its temperature, so that the reaction medium is subjected to a substantially homogeneous heat supply over the length of coil.

Arrows $E_1$ and $E_2$ represent the flow of the oil in the passages 59.

As is more particularly visible in FIGS. 2 to 7, the coil 5 is formed by two bundles of tubes. More specifically, a first bundle 51 is formed by tubes with a substantially constant bending radius $R_1$. A second bundle of tubes 52 is formed by tubes with a bending radius $R_2$ less than radius $R_1$. The bundles 51 and 52 are substantially cylindrical and centred on a central axis $X_5$ of the coil 5, this axis merging with axis X-X' when the coil is installed in the reactor 1.

The bundle 51 is formed by three segments of tube 511, 512 and 513 each wound along a helical generatrix and nested in one another, i.e. together forming the bundle 51.

In the same way, the bundle 52 is formed by two segments of tube 521 and 522 each wound along a helical generatrix and nested in each other.

Figure 3:
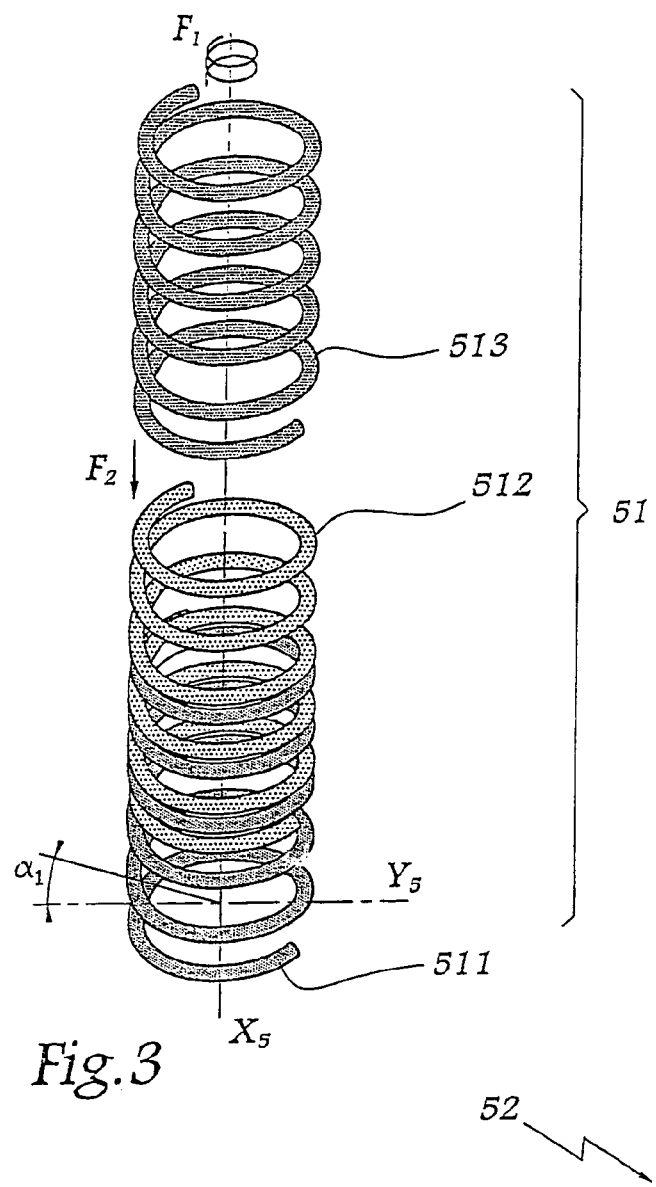
FIG. 3 schematically shows a step of manufacture of the coil of FIG. 2.

As is visible in FIG. 3, the bundle 51 is formed by "screwing" the segments 511, 512 and 513 about axis $X_5$ which is their common central axis. The arrow $F_1$ represents the interleaving of the segment 512 in the segment 511, this interleaving being translated by an advance of the segment 512 parallel to axis $X_5$, as represented by arrow $F_2$. In the same way, the segment 513 may be interleaved between the segments 511 and 512.

Figure 4:
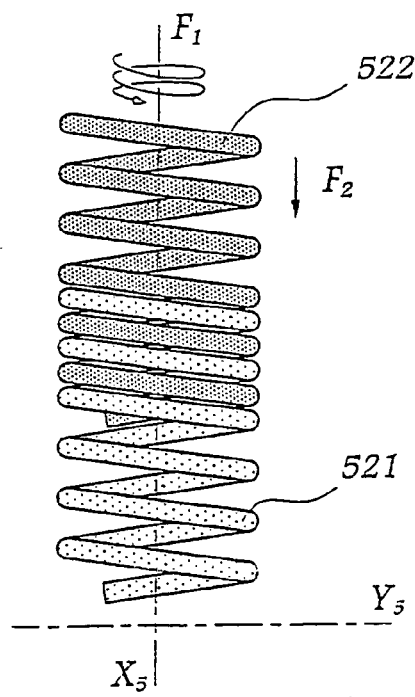
FIG. 4 is a view similar to FIG. 3 for another step of manufacture of the coil.

As is visible in FIG. 4, the bundle 52 is formed by the segment 522 interleaved in the segment 521 thanks to a movement of screwing represented by arrows $F_1$ and $F_2$.

When the two bundles 51 and 52 are each formed with a substantially cylindrical shape and with a predefined radius $R_1$ or $R_2$, it is possible to connect the segments of tube 511 to 513, 521 and 522 to a supply tank 53 forming distributor and to an outlet manifold 54, said tank and manifold each being of substantially toric shape and centred on axis $X_5$.

Figure 5:
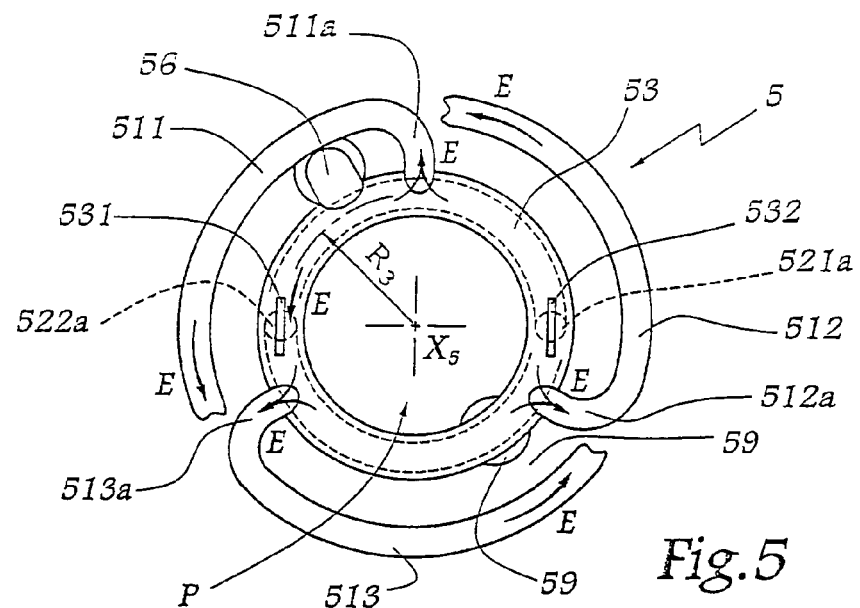
FIG. 5 is a plan view of the coil of FIG. 2.
Figure 6:
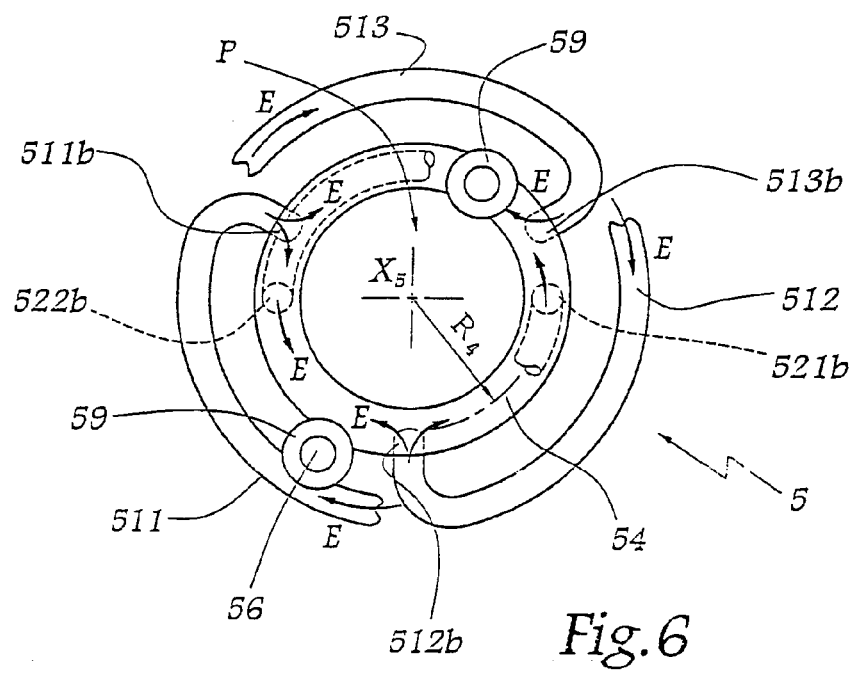
FIG. 6 is a view from underneath of the coil of FIG. 2.

Elements 53 and 54 have a diameter greater than that of the segments of tube 511 to 513, 521 and 522, with the result that they make it possible to efficiently supply these segments with coolant fluid and to efficiently collect the fluid coming from these segments, as is represented by arrows of flow E in FIGS. 5 and 6.

The radius $R_3$ of the torus formed by the tank 53 is chosen to be equal to radius $R_2$, in the same way as radius $R_4$ of the outlet manifold 54. In this way, elements 53 and 54 are substantially aligned with the bundle 52, with the result that they do not disturb a flow in the central part of the coil 5, such flow being represented by arrow E' in FIG. 1.

The tank 53 is provided with two lifting ears 531 and 532 for supporting the coil 5 when it is placed in position in the vessel 2 or when it is extracted therefrom. Other lifting means may be envisaged, on the tank 53 or on other parts of the coil 5.

A tube 56, substantially parallel to axis $X_5$, is housed between the bundles 51 and 52, this tube making it possible to supply the tank 53 from the passage 59 connected to the tube 61 of the vaporizer 6. This tube 56 has an internal cross-section substantially equal to that of the tank 53.

As is more particularly visible in FIG. 5, the three segments of tube 511, 512 and 513 are connected to the tank 53 by connections 511a, 512a and 513a extending in an essentially radial direction with respect to the tank 53. Furthermore, the tubes 521 and 522 are connected to this tank 53 by connections 521a and 522a extending beneath the tank 53, i.e. in a direction substantially parallel to axis $X_5$, while the connections 511a, 512a and 513a are substantially perpendicular to this axis.

In the same way and as is visible in FIG. 6, the tubes 511 to 513 are connected by essentially radial connections 511b, 512b and 513b to the manifold 54, while tubes 521 and 522 are connected to the manifold 54 by essentially axial connections 521b and 522b.

The radii $R_1$ and $R_2$, the height $h_5$ of the coil 5 and the positioning of the elements 53 and 54 may be chosen so that the segments of tube 511 to 513, 521 and 522 present substantially the same length. These segments have the same internal cross-section. In that case they induce substantially the same pressure drop on the flow of coolant fluid.

With the foregoing in mind, it will be readily understood that the segments 511, 512, 513, 521 and 522 are mounted in parallel with respect to one another between the elements 53 and 54, which makes it possible to obtain relatively slight pressure drops, taking into account, in particular, the fact that the overall pressure drop of the three tubes 511, 512 and 513 is substantially less than that which would be generated by a single tube in helical configuration forming, alone, a bundle as dense as bundle 51.

In addition, the unitary slope of each of the tubes 511 to 513, which may be defined, as illustrated in FIGS. 1 and 3, by angle $\alpha_1$ between a tube and a line $Y_5$ normal to axis 5, is substantially greater than the slope that a single tube, in helical configuration, would have in order to constitute the bundle 51 alone. This considerably reduces the risks of accumulation of condensates inside the segments 511 to 513 and minimizes the liquid retention in the lower part of these tubes.

The foregoing observations are also applicable to the tubes 521 and 522 of the second bundle 52.

As the tube 56 extends in a direction substantially parallel to axis X-X' of the vessel 2, it does not disturb the flow E' of the reaction medium to a substantial degree.

In practice, the radius $R_2$ of the inner bundle 52 is chosen to have a value included between 20% and 40% of the radius R of the vessel 2. Under these conditions, the central well P formed by the bundle 52 in the volume V of the reactor 1 is sufficiently wide for the re-circulation of reaction medium generated by the agitator 4 to be efficient.

It will also be noted that the construction of the coil 5 allows its geometry to be adapted to that of the bottom 21 of the vessel 2, with the result that the dead volume of the reactor 1, i.e. that part where little re-circulation is created, is limited to a maximum.

The invention has been shown with a coil 5 comprising an outer bundle 51 and an inner bundle 52. However, it is applicable with a coil comprising a single bundle composed of at least two nested segments of tube with a helical configuration.

In the case of a coil comprising one sole bundle, the radius of this bundle may be chosen with a value included between 20 and 70% of the radius of the reactor vessel.

The invention has been shown with the outer bundle 51 comprising three segments of tube 511, 512 and 513. However, it is applicable with a bundle comprising two segments or, on the contrary, more than three segments.

The invention has been shown with an agitator 4 arranged around the coil 5. However, it is also applicable with an agitator which might penetrate in the central well of the coil 5.

In that case, the radii $R_1$ and $R_2$ of the coil 5 might be increased and the agitator might take the form of an endless screw.

The invention is independent of the exact type of vaporizer 6 and of the nature of the coolant fluid employed.

Figure 7:
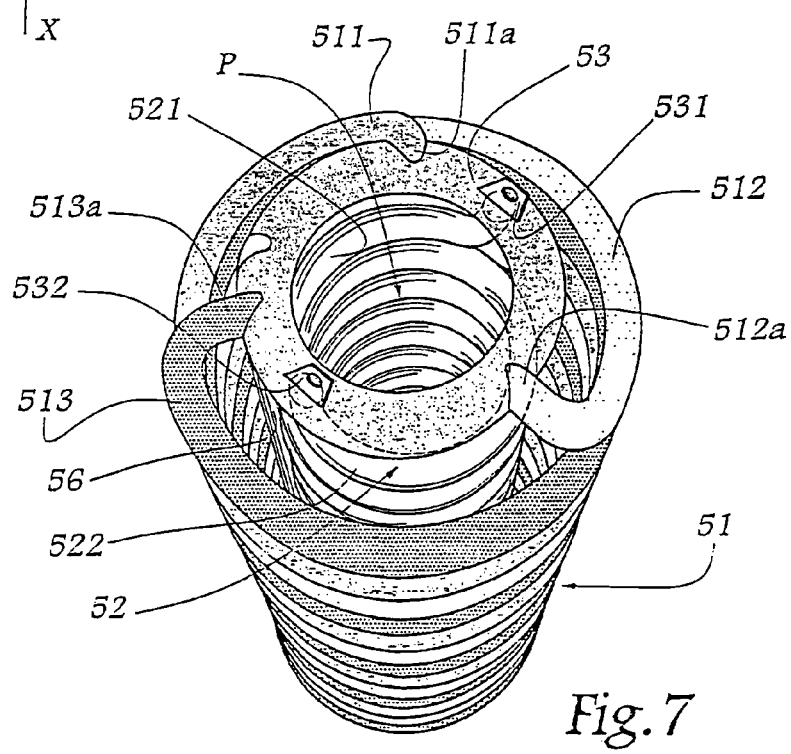
FIG. 7 is a view in perspective of the coil of FIGS. 2 to 6.

In FIGS. 3, 4 and 7, different textures have been used solely in order to differentiate the different parts of the coil 5 visually.

The invention claimed is:

1. A reactor for treating a viscous medium or for carrying out chemical reactions in viscous medium, said reactor comprising:
    a vessel defining an inner volume; and
    a coil in said inner volume for circulation of a coolant fluid, said coil comprising
    a first segment of tube wound along a helical generatrix, and a second segment of tube wound along a helical generatrix and extending in parallel to the first segment between a distributor and a manifold, said first and second segments being centered on the same geometrical axis with substantially the same bending radius and nested so that they together form a substantially cylindrical bundle; wherein the distributor is located within said inner volume and is curved with a radius substantially equal to the bending radius; the distributor arranged substantially coaxially with the bundle;
        wherein the bundle constitutes a first bundle the coil further comprising a second bundle of cylindrical shape centered on said axis and curved with a radius different from said radius of said first bundle;
        wherein the coil further comprises a tube extending in a direction substantially parallel to said axis between said first and second bundles, said tube being connected either to said distributor or to said manifold.

2. The reactor according to claim 1, wherein said second bundle is formed by at least two segments of tubes wound along helical generatrices, nested and extending in parallel between said distributor and said manifold.

3. The reactor according to claim 1, wherein said bundle is formed by three segments of tube wound along helical generatrices and nested.

4. The reactor according to claim 1, wherein said segments have substantially the same length and/or induce substantially the same pressure drop on the flow of said coolant fluid, between said distributor and said manifold.

5. The reactor according to claim 1, wherein said distributor and/or said manifold being in the form of a torus and centered on said axis.

6. A reactor according to claim 1, further comprising an agitator arranged around or inside said coil.

7. A reactor according to claim 6, wherein said agitator is suspended from a ceiling of said reactor and forms a cage surrounding said coil the supply and evacuation of the coolant fluid towards or from said coil being effected through the bottom of said reactor.

8. A reactor according to claim 1, wherein the radius of said second bundle is less than that of said first bundle and being between 20 and 70% of the radius of said inner volume.

9. A reactor according to claim 8, wherein the radius of said second bundle is between 20 and 40% of said radius of said inner volume.

10. A process for the treatment of a viscous medium comprising the step of treading said liquid in a reactor as defined in claim 1 and of an inner volume greater than about 8 $m^3$.

11. The process according to claim 10, wherein said treatment is a reaction of polymerization.

12. The process according to claim 11, wherein the reaction is a discontinuous reaction of polymerization.

13. The process according to claim 11 wherein the reaction is a continuous reaction of polymerization.

14. A reactor for treating a viscous medium or for carrying out chemical reactions in viscous medium; said reactor comprising:
a vessel defining an inner volume; and
a coil in said inner volume for circulation of a coolant fluid, said coil comprising a first segment of tube wound along a helical generatrix, and a second segment of tube wound along a helical generatrix and extending in parallel to the first segment between a distributor and a manifold, said first and second segments being centered on the same geometrical axis with substantially the same bending radius and nested so that they together form a substantially cylindrical bundle; wherein the manifold is located within said inner volume and is curved with a radius substantially equal to the bending radius; the manifold arranged substantially coaxially with the bundle;
wherein the bundle constitutes a first bundle the coil further comprising a second bundle of cylindrical shape centered on said axis and curved with a radius different from said radius of said first bundle;
wherein the coil further comprises a tube extending in a direction substantially parallel to said axis between said first and second bundles, said tube being connected either to said distributor or to said manifold.

15. The reactor according to claim 14, wherein said second bundle is formed by at least two segments of tubes wound along helical generatrices, nested and extending in parallel between said distributor and said manifold.

16. The reactor according to claim 14, wherein said bundle is formed by three segments of tube wound along helical generatrices and nested.

17. The reactor according to claim 14, wherein said segments have substantially the same length and/or induce substantially the same pressure drop on the flow of said coolant fluid, between said distributor and said manifold.

18. The reactor according to claim 14, wherein said distributor and/or said manifold being in the form of a torus and centered on said axis.

19. A reactor according to claim 14, further comprising an agitator arranged around or inside said coil.

20. A reactor according to claim 19, wherein said agitator is suspended from a ceiling of said reactor and forms a cage surrounding said coil, the supply and evacuation of the coolant fluid towards or from said coil being effected through the bottom of said reactor.

21. A reactor according to claim 14, wherein the radius of said second bundle is less than that of said first bundle and being between 20 and 70% of the radius of said inner volume.

22. A reactor according to claim 21, wherein the radius of said second bundle is between 20 and 40% of said radius of said inner volume.

23. A process for the treatment of a viscous medium comprising the step of treading said liquid in a reactor as defined in claim 14 and of volume greater than about 8 m$^3$.

24. The process according to claim 23, wherein said treatment is a reaction of polymerization.

25. The process according to claim 24, wherein the reaction is a discontinuous reaction of polymerization.

26. The process according to claim 24 wherein the reaction is a continuous reaction of polymerization.

* * * * *